Aug. 9, 1966   E. V. B. REGAN ETAL   3,265,438
SEAT

Filed Nov. 27, 1964   2 Sheets-Sheet 1

INVENTORS.
Edward V. B. Regan and
BY Norris E. Shoemaker

Christel & Bean
ATTORNEYS.

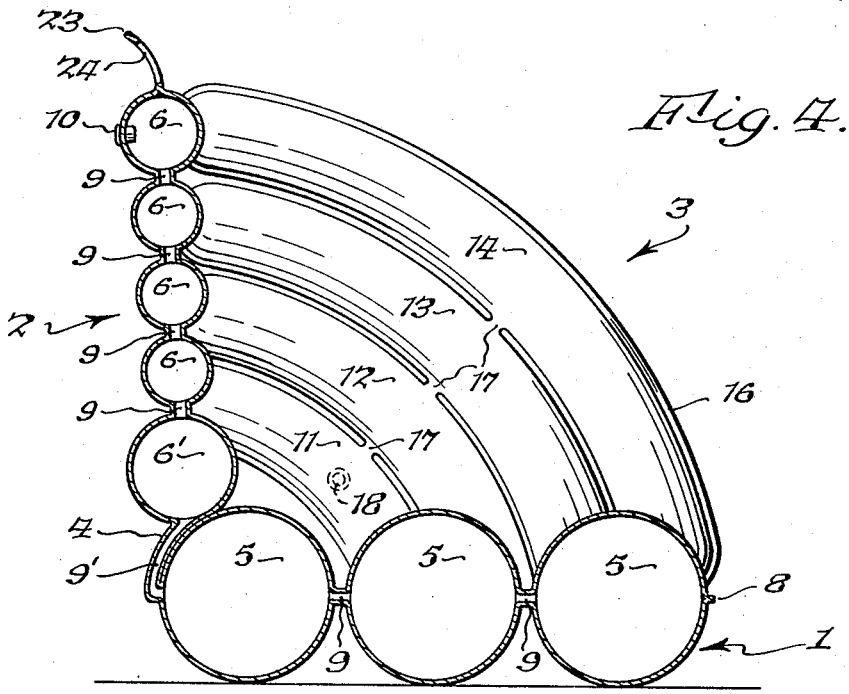
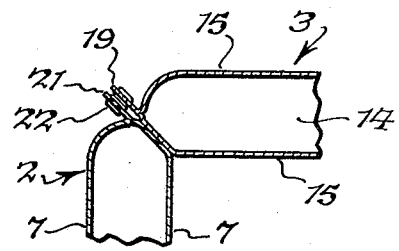
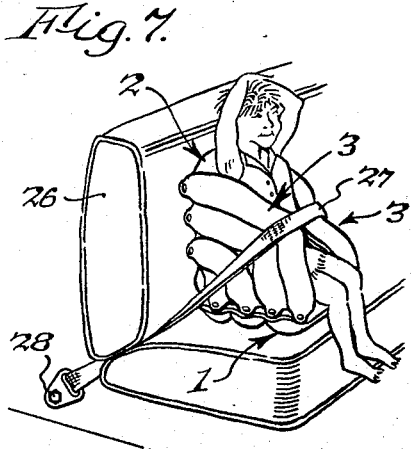
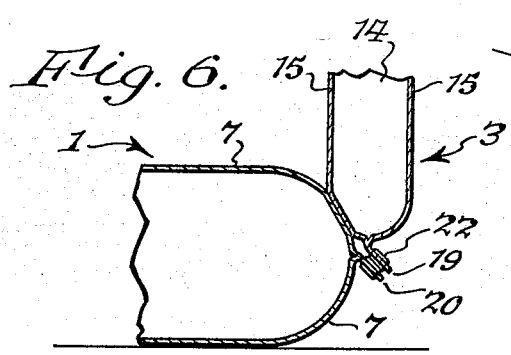

3,265,438
SEAT
Edward V. B. Regan, 20 Melbourne Place, Buffalo, N.Y., and Norris E. Shoemaker, Williamsville, N.Y.; said Shoemaker assignor to said Regan
Filed Nov. 27, 1964, Ser. No. 414,337
3 Claims. (Cl. 297—380)

This invention relates to a pneumatic seat, and more specifically to an inflatable seat especially adapted as an auxiliary seat for children. However, its utility is not limited thereto.

Children often become restless when asked to sit on a seat or in a chair meant for adults, because the seat height is too low for a child. When seated at a table, for example, the child will be uncomfortable and at a disadvantage unless he is elevated by books, a cushion or whatever might be available. In an automobile, he will be unable to see out over the dashboard or through the window, and will want to stand. This is dangerous, and distracting to the driver.

Various types of auxiliary seats are available, but they tend to be bulky and in the way when not in use. Even where they can be collapsed they tend to be inconvenient and a nuisance to carry around, for example in an automobile. Also, while they serve to elevate the child, they often are not particularly comfortable to sit in for prolonged periods of time.

Accordingly, a primary object of our invention is to provide an inflatable seat which can be used for example as an auxiliary seat in conjunction with a standard chair or with a vehicle seat and which can be deflated and collapsed for ease of transport and storage.

Another object of our invention is to provide the foregoing in a seat which cushions the child for maximum comfort.

It is also an extremely important object of our invention to provide a pneumatic seat having the foregoing characteristics and adapted, when used as an auxiliary seat in conjunction with a vehicle seat, to receive a vehicle lap or shoulder strap therearound in a manner conforming the pneumatic seat to the occupant for added comfort and protection.

In one aspect thereof, a pneumatic seat constructed in accordance with our invention is characterized by the provision of opposite side portions, a seat back portion and a seat cushion portion, each of these portions being inflatable and being resiliently yieldable when inflated.

In another aspect thereof, a pneumatic seat constructed in accordance with our invention is characterized by the provision of inflatable seat back and cushion portions hinged together adjacent their inner ends for movement of the seat back into and out of a generally upright position of use relative to the seat cushion, opposite side portions of generally triangular side view form extending between the seat back and cushion, the side portions being connected to both the seat back and cushion thereby holding the seat back in its position of use and being detachable from at least one of the seat back and cushion for movement of the back out of its position of use.

The foregoing and other objects, advantages and characterizing features of the pneumatic seat of our invention will become clearly apparent from the ensuing detailed description of an illustrative embodiment thereof, in conjunction with the accompanying drawings depicting the same wherein like reference numerals denote like parts throughout the various views and wherein:

FIG. 4 is a vertical sectional view thereof, on an enlarged scale, taken about on line 4—4 of FIG. 2;

FIG. 5 is a fragmentary sectional view thereof, taken about on line 5—5 of FIG. 1;

FIG. 6 is another fragmentary sectional view thereof, taken about on line 6—6 of FIG. 1; and FIG. 7 is a perspective view of a seat constructed in accordance with our invention in use in a vehicle, showing a child strapped in the seat by a conventional vehicle lap strap.

Figure 1:
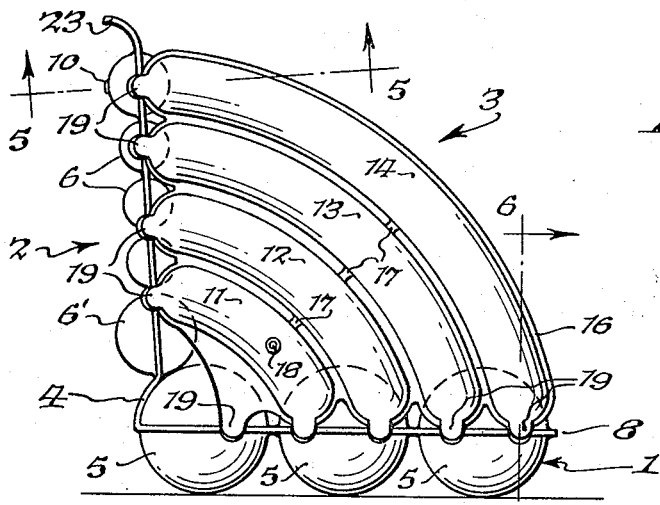
FIG. 1 is a side elevational view of a pneumatic seat of our invention.
Figure 2:
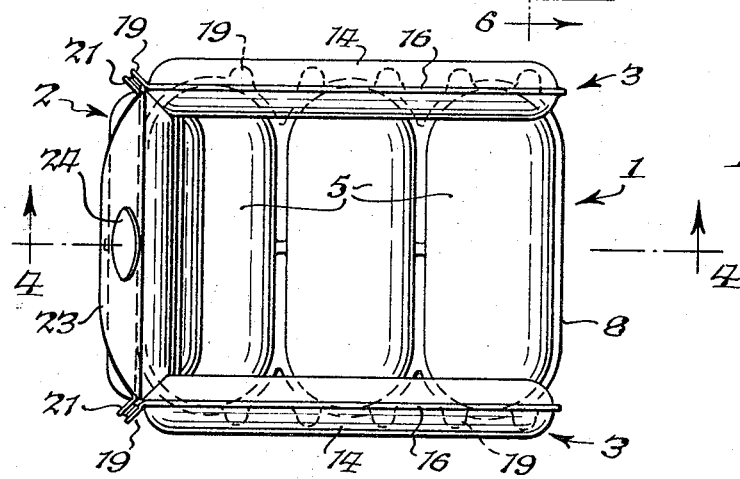
FIG. 2 is a top plan view thereof.
Figure 3:
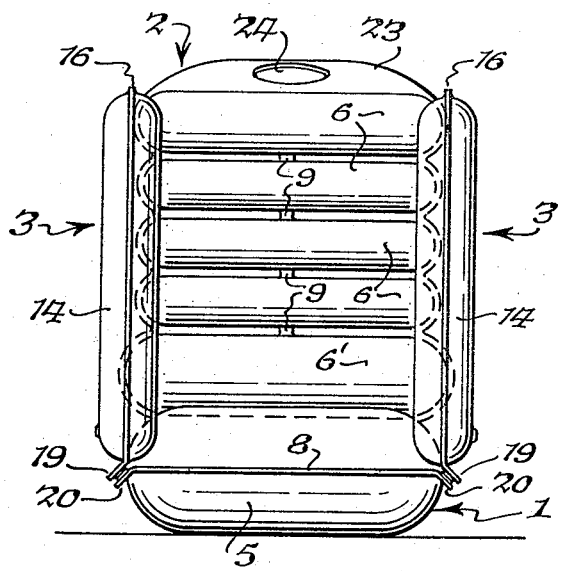
FIG. 3 is a front elevational view thereof.

Referring now in detail to the illustrative embodiment depicted in the accompanying drawings, there is shown a pneumatic seat of our invention fully inflated and ready for use. The seat comprises a cushion portion, generally designated 1, a back portion generally designated 2, and opposite side portions each generally designated 3.

Cushion 1 and back 2 are preferably, although not necessarily fabricated as a unitary construction, being joined at their inner ends by a hinge portion 4. The entire seat is fabricated of a suitable air impervious, resiliently flexible material such as rubber or plastic sheet material. The seat portions 1, 2 and 3 can be molded, and are formed to provide, in the case of cushion 1, a series of substantially parallel, generally cylindrical air cells 5. Back 2 is molded to provide a series of substantially parallel, generally cylindrical cells 6 and 6'.

Cushion 1 and back 2 can be fabricated as a single assembly by molding two sheets 7 of polyethylene or other suitable plastic material to comprise mating half sections each containing semi-cylindrical cell formations joined by connecting web formations and having peripheral flanges 8 around the molded sheets. The flanges and connecting webs then are bonded together, as by heat sealing, to provide the cushion and back.

Cells 5, 6 and 6' are connected in series communication with each other throughout by means of air passageways 9 formed in the webs interconnecting adjacent cells, and the passageway 9' through hinge 4. In this way, the complete cushion 1 and back 2 can be inflated through a single inflating valve 10.

Each of the opposite sides 3 can be formed in like manner to provide a series of substantially concentric, arcuate cells 11, 12, 13 and 14, which cells are of progressively increasing length proceeding outwardly from the juncture between cushion 1 and back 2. Thus, sides 3 can be formed of mating half sections 15 of any suitable material having peripheral flanges 16 and connecting webs bonded as by heat sealing. The cells 11–14 of each side 3 are connected in series communication with one another by air passages 17 formed in the connecting web between adjacent cells, whereby a single inflating valve 18 can be used to inflate all of the cells of each side 3.

Cushion 1 and back 2 are fabricated as a single assembly. The sides 3 are separate assemblies. In the illustrated embodiment sides 3 are formed to provide tabs 19 at spaced points along the bottom and rear sides thereof. Corresponding tabs 19 and 21 are formed on cushion 1 and back 2, respectively, at spaced points therealong. Tabs 19 and 20 and 19 and 21 can be bonded together for permanent assembly of sides 3 to cushion 1 and back 2. Preferably, however, they are detachably connected.

To this end, the corresponding tabs 19, 20 and 19, 21 carry mating fastener parts such as the male and female halves of conventional, button type snap fasteners 22. In this way, tabs 19, 20 and 19, 21 are adapted to snap together for holding the seat portions assembled in the illustrated position of use. This has the advantage that when the seat is not in use the sides 3 can be either completely detached from both cushion 1 and back 2, or detached from either one of them. When this is done, back 2, and sides 3 if they are not completely detached, can be unfolded to a flat position, substantially in the plane of cushion 1, for ease of storage. The seat then can be used as a simple air cushion. Alternately, the various seat portions can be deflated and stored in a small container.

The cells 5 comprising cushion 1 are much larger in diameter or cross sectional area than the cells of back 2 and sides 3. This provides a seat cushion of substantial depth. When placed on a conventional chair, for example, it will elevate a child well above the conventional chair seat height. When positioned on a vehicle seat cushion against the vehicle seat back it will materially elevate the occupant, enabling a child placed in the seat to see over the dashboard and out the vehicle windows. Also, the resiliently compressible, yieldable portions cushion the child and adjusts automatically to the contour of the child. As a result of being able to see, in such complete comfort, the child will be perfectly willing and content to remain seated. Distraction of the driver by the child moving about thereby is avoided.

Cells 6 and 11–14 are smaller, because these portions do not elevate and require only cushioning thickness. Cell 6' is of an intermediate size, because of its location immediately adjacent cushion 1. The upper cell 6 also can be enlarged somewhat, as illustrated, if desired.

Sides 3 are of substantial depth, which can be varied according to the size of the intended occupant. This, together with the arcuate form of sides 3 causes them to project outwardly enough to ensure complete cushioning of the child on opposite sides and enabling flexing of the sides around a child in the seat, as clearly shown in FIG. 7. When used, for example as an auxiliary seat in a vehicle, the pneumatic seat of our invention is placed on the vehicle seat cushion 25 against the vehicle seat back 26. It will be noted that the outermost side wall cells 14 are omitted in the form shown in FIG. 7. A conventional lap strap 27, fastened in the usual manner as shown at 28 to the vehicle floor 29, is brought around the opposite sides 3 of the pneumatic seat and across the lap of a child seated therein. The strap 27 will flex sides 3 inwardly around the front of the child, to extend across his stomach and hips. The pneumatic seat is thereby wrapped around the child's body in closely conforming, cushioning relation. This makes the child even more comfortable and secure, and more willing to remain seated. Also, it provides a resilient cushion between the child and the strap, tending to distribute and thereby relieve the restraining force and stress of the strap on the child. It also tends to hold the strap in proper position around the hips of the child, reducing any tendency of the strap to slip upwardly over the abdomen.

Thus, there is provided a seat which can be deflated for storing and packaging, and which occupies so little room when deflated that it can be carried conveniently in a vehicle, for example, when not in use. When it is desired to use the seat, it is readily inflated by mouth, or by a small hand bellows if desired. Sides 3, when connected to cushion 1 and back 2, hold these parts in their proper position for use. Hinge 4 can be bonded to the adjacent cell 5, to assist in maintaining the desired relation between the inflated seat portions. However, when not in use sides 3 can be detached and the entire seat collapsed. The seat is extremely lightweight, and provides a resiliently yieldable cushion beneath, behind and on opposite sides of the child. The cushioning action of the seat is extended across the front of the child when used in conjunction with a lap strap. Where desired, the degree of inflation can be varied, to vary the seating height and to accommodate children of different sizes. The number and size of the cells in cushion 1, back 2 and sides 3 can be varied to adapt the seat to the size of the intended occupants.

A relatively large tab portion 23 can be provided at the upper end of back 2, and can have an aperture 24 for hanging the seat back and cushion, with or without sides 3, from a support when not in use.

Accordingly, it is seen that our invention fully accomplishes its intended objects. While only one embodiment has been disclosed in detail, that has been done by way of illustration only, without thought of limitation.

Having fully disclosed and completely described our invention, and its mode of operation, what we claim as new is:

1. A pneumatic seat comprising an inflatable body having opposite side portions and seat back and cushion portions, said back and cushion portions comprising a plurality of substantially parallel generally cylindrical air cells, said cushion portion air cells being larger in cross-sectional area than said back cushion air cells, said side portions comprising a series of substantially concentric, curved air cells of generally circular cross section, said side portions being connected at spaced intervals to both of said seat back and cushion portions substantially along the entire longitudinal edges of said seat back and cushion portions, said body being resiliently yieldable when inflated and said side portions being flexible inwardly around an occupant of said seat.

2. A pneumatic seat as recited in claim 1 wherein said seat back and cushion portion are of unitary construction having multiple air cells in communication with each other throughout.

3. A pneumatic seat as recited in claim 1 wherein said seat back and cushion portions are hinged together adjacent their inner ends for relative movement into and out of a position of use, said side portions being connected to both of said seat back and cushion portions and thereby holding said seat back portion in said position of use, said side portions being detachable from at least one of said back and cushion portions for movement of the former out of said position of use.

References Cited by the Examiner

UNITED STATES PATENTS

| 2,987,735 | 6/1931 | Nail | 5—348 |
| 3,083,381 | 5/1963 | Bailey | 5—347 |
| 3,093,407 | 6/1963 | Wilson | 297—4 |
| 3,136,579 | 6/1964 | Hunter | 297—385 |

FOREIGN PATENTS

| 923,033 | 1/1955 | Germany. |
| 491,990 | 9/1938 | Great Britain. |
| 776,934 | 6/1957 | Great Britain. |
| 926,425 | 5/1963 | Great Britain. |

FRANK B. SHERRY, *Primary Examiner.*

C. A. NUNBERG, *Assistant Examiner.*